April 28, 1942.   G. H. COTE   2,281,416
TOOL HOLDER
Filed June 10, 1941   2 Sheets-Sheet 2

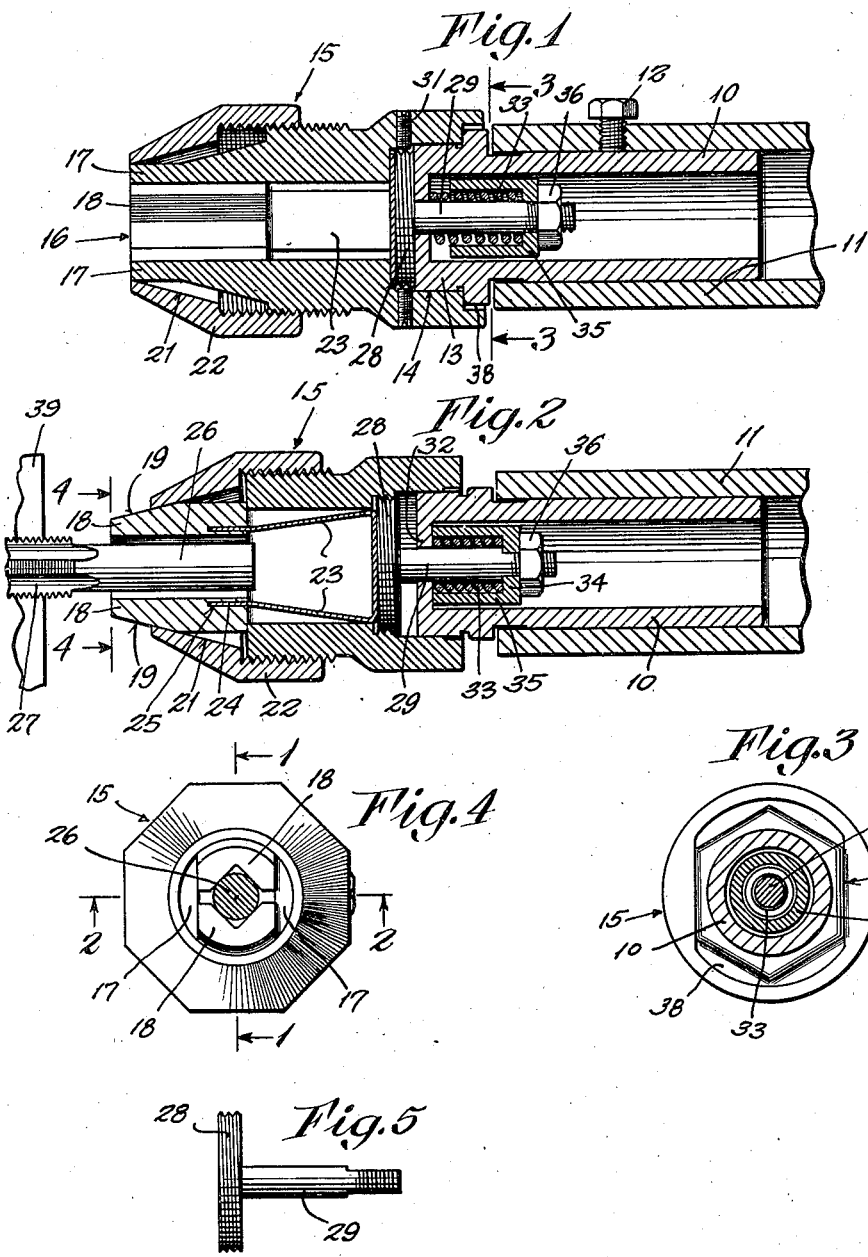

INVENTOR
George H. Cote
BY Johnson, Klein and Smyth
ATTORNEYS

Patented Apr. 28, 1942

2,281,416

UNITED STATES PATENT OFFICE 2,281,416

TOOL HOLDER

George H. Cote, Bridgeport, Conn.

Application June 10, 1941, Serial No. 397,352

13 Claims. (Cl. 10—89)

This invention relates to a holder particularly adapted to be used in automatic screw machines or the like for holding a thread cutting tool such as a tap or die.

In holders previously used of the type contemplated by the present invention, means have been provided for holding the tool carrier against rotation while the tool was operating on the workpiece but which permitted the carrier a limited axial movement relative to the turret of the machine, in accordance with the pitch of the thread being cut, after movement of the turret had been arrested. This axial movement of the carrier relative to the turret disengaged the holding means, whereupon the carrier was free to revolve with the workpiece until such time as a stop made operative by the revolutions of the carrier, again held the carrier against rotation in a direction opposite to that of the thread cut to enable the workpiece to be run or backed off the tool.

In these prior devices, difficulty has been experienced because the means used to hold the tool carrier against rotation during the cutting operation, particularly where such means included interlocking elements such as detents or the like would often release the carrier for rotation prior to the completion of the cutting operation. This was brought about by reason of the interlocking elements yielding sufficiently to allow the elements to disengage prematurely, which elements, after returning to normal position, would strike one another as the carrier rotated with the workpiece resulting in damage to the elements themselves as well as to the workpiece.

This difficulty is overcome by the present invention, for the means used for holding the carrier against rotary movement during the cutting operation does not include any yieldable means, but rather a means made up entirely of rigid elements which, upon disengagement, free the carrier for rotation without interference, thus eliminating the damage to the workpiece and tool often brought about in the prior holders.

In the now preferred form of the invention, the means for holding the carrier against rotation during the cutting operation comprises a positive clutch connection disengaged by relative axial movement of the component parts thereof. The clutch connection comprises a noncircular cavity formed at the rear of the carrier having one or more flat sides and adapted to receive a collar carried by a mandrel forming a part of the holder adapted to be mounted in the turret of the screw machine. The collar is formed with one or more flat surfaces, which are adapted to engage the flat side or sides of the cavity.

The carrier sleeves the mandrel, and, though it may move axially thereof, it is positively held against rotary movement as long as the flats of the mandrel engage the flat sides of the cavity. The carrier is free to rotate as soon as the flats of the mandrel are displaced from the cavity of the carrier and as all component parts of the clutch are rigid and will not permit disengagement prematurely there is no likelihood of the parts striking each other and all damage or wear through interference of the clutch parts is obviated.

To insure that the axis of the carrier is maintained coincident with the axis of the mandrel, the mandrel is formed with a coaxial cylindrical surface accurately ground to snugly fit within a cylindrical cavity at the rear of the carrier, the wall of which is concentric with the axis of the carrier. The close fit of the carrier on the mandrel further insures that the flats of the mandrel will accurately engage the flat sides of the noncircular cavity of the carrier thus preventing any play of the same relative to the mandrel during the thread cutting operation.

In the previously proposed tool holders, the carrier revolved with the workpiece only until such time as a stopping device could be made operative to again hold the carrier against rotation in a direction opposite to that of the thread cut so that the workpiece could be run or backed off the tool after the cutting operation had been completed. The stop is generally in the form of a ball clutch which is made operative through the rotary movement of the carrier, and often if care was not taken stops the rotation of the carrier too quickly and snaps the tap or mars the threads of the die.

In the present invention, although means are provided for holding the carrier against rotation after the positive drive has been disengaged and the direction of travel of the tool holder is reversed, there is no likelihood of damage to the threading tool, for the means is in the form of a friction brake and gradually restrains the carrier against rotational movement with the workpiece.

In the form of the invention illustrated as exemplary thereof, the means for holding the carrier against rotation after the cutting operation comprises a friction brake which is made operative by further axial movement of the carrier relative to its mount, i. e., a predetermined distance greater than that distance necessary to cause disengagement of the clutch.

The construction of the brake as now preferred comprises a part fixed to the carrier against rotation relative thereto and which is moved into engagement with the part of the holder fixed to the turret as the carrier is axially moved relative to the mandrel after the completion of the cutting operation.

The brake frictionally restrains rotary movement of the carrier in either direction so that no adjustment need be made to the holder to separate the tool from the workpiece after cutting a left or right hand thread as was necessary in the holders heretofore used.

Other features and advantages will hereinafter appear.

In the accompanying drawings:

Figure 1 is a longitudinal section taken along line 1—1 of Fig. 4, showing a tap holder embodying the features of the present invention and the normal relative positions of the clutch and brake parts.

Fig. 2 is a view similar to Fig. 1, but taken along line 2—2 of Fig. 4, and showing the relative positions of the brake and clutch parts at the completion of the cutting operation.

Fig. 3 is a section taken along line 3—3 of Fig. 1.

Fig. 4 is a front elevational view of the tool holder.

Fig. 5 is an elevational view of a portion of the coupling member.

Figure 6:
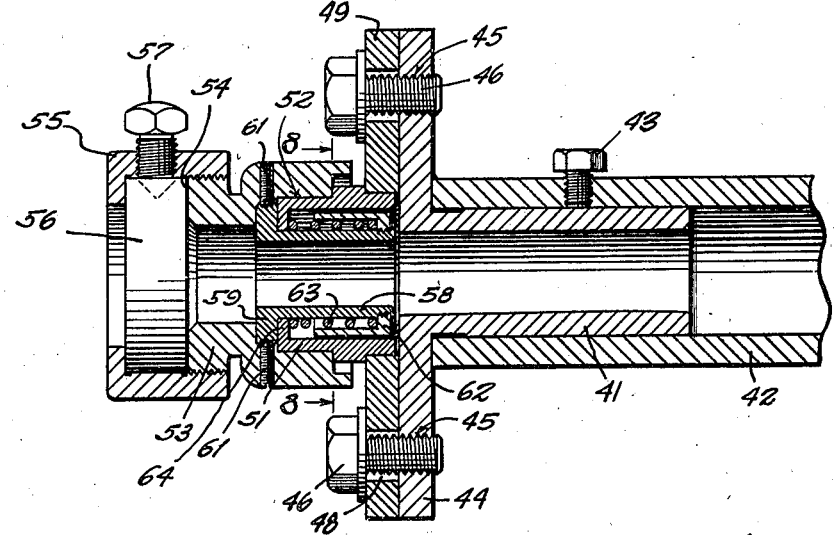
Fig. 6 is a longitudinal section similar to Fig. 1, but showing a die holder embodying the features of the present invention.

There is shown, referring now to Fig. 1, a tap holder embodying the features of the present invention and as disclosed the tap holder is provided with a shank 10 adapted to be secured in a turret or other head 11 of a screw machine or the like by suitable set screws 12 provided for that purpose. The shank 10 is provided with a coaxial cylindrical surface forming a mandrel 13 accurately ground to closely fit the cylindrical bore 14 of the tool carrier 15. The wall of the bore 14 is accurately ground concentric with the axis of the carrier thus the axis of the latter will be mounted coincident with the axis of the shank.

The carrier terminates at the opposite end in a cylindrical nose portion provided with a slot 16 extending therethrough and forming a pair of tines 17. The slot slidably receives a pair of jaws 18, referring now to Fig. 2, each having faces shaped to snugly engage the side and end walls of the slot. Each jaw is formed with a camming surface 19 cooperable with a camming surface 21 formed on the interior of a cap 22 threaded onto the carrier 15. The cap, due to the action of the camming surface 21 against the camming surfaces 19 of the jaws 18, permits the jaws to be relatively adjusted as the cap is adjusted relative to the carrier.

To hold the jaws in the maximum separation allowed by the position of the cap 22, a U-shaped spring 23 has the forward ends of its legs 24 driven into and held by force fit in transverse slots 25 provided in the rear ends of the jaws 18.

The jaws, although urged apart by the legs of the spring 23, nevertheless move radially rather than pivotally, for the cap 22 holds the end faces of the jaws tightly against the end wall of the slot 16. The end wall of the slot is perpendicular to the axis of the carrier, and, as the end faces of the jaws are accurately machined so that they are perpendicular to their gripping faces, the jaws will hold the shank 26 of a tool such as the tap 27 in exact alignment with the axis of the carrier.

To couple the carrier to the shank 10 and to hold the spring 23 in position, a disk 28 carrying a centrally disposed stem 29 is threaded into the rear of the carrier and held in that position against removal by set screws 31. The disk 28 forms a seat for the bow of the spring 25 and holds it against movement as the jaws 18 are adjusted.

The stem 29 projects through an aperture formed in an end closing wall 32 of the shank 10 and a spring 33 sleeving the stem seats upon the interior surface of the wall 32 and acts against the wall 34 of a thimble 35. The wall 34 of the thimble is formed with a noncircular opening which receives the slabbed end of the stem 29, the thimble being held in its desired position relative to the stem by a lock nut 36 threaded onto the end of the stem 29. The spring, acting against the thimble which is held against removal from the stem by the nut 36, will urge the carrier against the shank 10 and resist axial movement of the carrier relative to the shank.

The carrier, although it may move axially of the shank the distance permitted by the thimble 35, is normally held against rotation with respect to the shank by a positive clutch 37.

In the broader aspects of the present invention, the clutch 37 may comprise a slot, milled in the rear face of the carrier, having one or more flat sides adapted to receive one or more raised flats carried by the mandrel. In the form of the invention now preferred, the clutch 37 comprises a plurality of raised flat surfaces forming a collar on the shank 10, the opposite pairs of which are parallel. The raised flats of the shank are adapted to be received within a noncircular cavity 38 formed in the rear of the carrier and limit in one direction axial movement of the carrier relative to the shank. The longer sides of the cavity are parallel and spaced apart a distance substantially equal to the distance between opposite pairs of the flats so that the walls thereof will be snugly engaged by a pair of the same. So long as the flats of the shank engage the walls of the cavity, the carrier will be positively held against rotation and the tap 27, when brought into engagement with the revolving workpiece 39, will cut threads on the wall of the opening formed therein. The close fit of the carrier on the mandrel insures that the flats of the latter will accurately engage with the flat walls of the cavity thus preventing any play of the carrier relative to the mandrel during the cutting operations.

In present day screw machine practice, the tool-carrying turret is generally moved toward the work-piece to bring the tool into engagement with the same and to feed the tool during at least a part of the thread cutting operation. Movement of the turret toward the workpiece is limited by a stop provided for that purpose, the carrier thereafter permitting the tool to move relative to the workpiece a distance sufficient to complete the cut as the tool follows its own lead on the workpiece.

In the present invention, movement of the tool relative to the workpiece will move the carrier 15 axially of the mandrel 13 and this movement of the carrier will bring about a relative displacement of the flats of the shank with the walls of the cavity, which continues until the carrier is released therefrom and becomes free to rotate with the workpiece.

Inasmuch as the action of the clutch is positive, for all component parts of the same are rigid, the carrier cannot be forced free for rotation, but, once free, will rotate without interference from the clutch parts.

To permit the workpiece to be run or backed off the tool by merely backing off the holder and reversing the direction of rotation of the spindle, the present invention provides means for frictionally restraining rotation of the carrier, this means being rendered operative by relative movement between the carrier and the mandrel a predetermined distance greater than that necessary to cause disengagement of the clutch parts.

Various means may be used to frictionally restrain rotational movement of the carrier at this point in the operation, but preferably the means, as shown by the present invention, comprises the edge face of the thimble 35 at the open end thereof and the interior surface of the wall 32 of the shank 10.

It will be seen, referring to Fig. 2, that relative movement of the carrier and the shank will bring the edge of the thimble into engagement with the surface of the wall 32, and, as the thimble is fixed to rotate with the stem 29, the frictional engagement between the edge face of the thimble and the wall 32 of the shank will effectively restrain rotary movement of the carrier.

The relative movement of the carrier and shank sufficient to bring the edge face of the thimble into engagement with the wall 32 is brought about by the return movement of the turret as it moves back from its working position, for the shank, as it is fixed to the turret, will move with the same, but the carrier, as the tool is still engaging the workpiece, will be held against movement with the carrier. It will be seen that the restraining effect on the carrier brought about by the engagement of the thimble with the wall will be a gradual one so that all danger of the carrier being suddenly held against rotation is obviated.

The braking effect of the surface of the wall 32 on the edge face of the thimble as it is brought into engagement therewith is such as to restrain rotation of the carrier in either direction. This feature of the present invention permits a workpiece having either a right or left hand thread to be run or backed off the tap without adjusting the holder as is necessary in prior holders wherein the brake means held the carrier against rotation in one direction or the other depending upon the direction of the thread cut.

The carrier, as the workpiece is withdrawn from the tap, is brought back to its normal position as shown in Fig. 1, by the spring 33. The carrier, as its turning movement is not completely arrested while the finished workpiece is being run off the tap, will generally revolve sufficiently to bring a pair of the flats into proper position relative to the walls of the cavity and again hold the carrier against rotation as the turret moves forward into working position. If the flats do not properly seat within the opening, the operator may give the carrier a slight turn until a pair of the flats are brought into alignment with the flat parallel walls of the opening whereupon the spring 33 will move the carrier back sufficiently to bring the flats into the opening.

Figure 7:
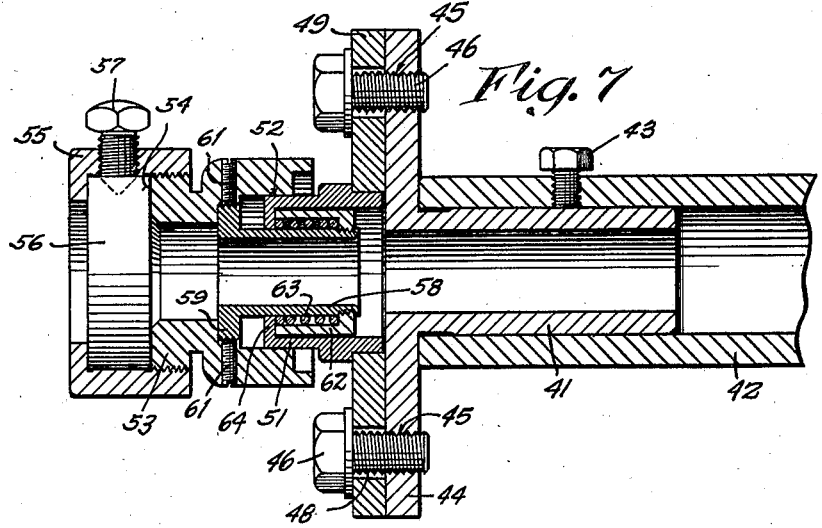
Fig. 7 is a view similar to Fig. 6, but showing the relative position of the brake and clutch parts at the completion of the thread cutting operation.
Figure 8:
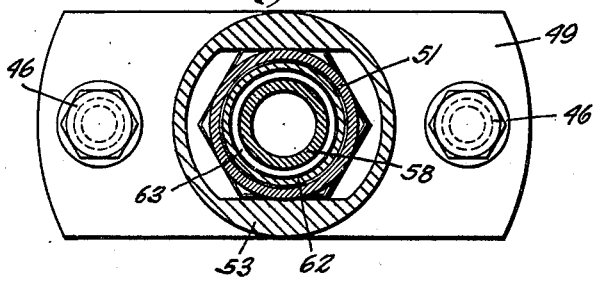
Fig. 8 is a sectional view taken along line 8—8 of Fig. 6.

There is shown in Figs. 6, 7 and 8, a holder for taking a button die and embodying the features of the present invention. As shown in these figures, the die holder has a shank 41 adapted to be secured in a turret or other head 42 of a screw machine or the like by set screws such as shown at 43. The shank is formed with a flange 44 having a pair of threaded holes 45 at diametrically opposite points thereon to receive studs 46 projecting through enlarged holes 48 formed at diametrically opposite points in a plate 49.

The plate 49 is formed with a centrally located aperture receiving the end of a sleeve 51 which is secured to the plate by any suitable means such as a weld. The axis of the sleeve is perpendicular to the face of the plate engaged by the flange 44 and the face of the latter is perpendicular to the axis of the shank.

The forwardly projecting portion of the sleeve is formed with a coaxial cylindrical surface 52 which forms a mandrel accurately ground to closely fit within a cylindrical cavity formed at the rear of the die carrier 53. The wall of the cavity is accurately ground concentric with the axis of the carrier and the engagement between the surface of the mandrel and wall of the cavity maintains the axis of the carrier coincident with the axis of the sleeve.

The forward face of the die carrier is formed with a seat 54, and a cap 55, threaded onto the carrier 53, holds the die 56 against the seat 54. A plurality of set screws, such as the one shown at 57 holds the die against rotary movement relative to the carrier 53. The carrier may be adjusted to bring the same into concentricity with the workpiece by merely loosening the studs 46 and shifting the plate 49 relative to the flange 44 and then tightening the studs after the carrier has been brought to proper position.

The carrier is movable axially of the mandrel and to limit this axial movement and to restrain rotary movement of the carrier relative to the shank during certain periods of the cutting operation, a sleeve 58 having an outturned flange 59 is threaded into the rear of the carrier and fixed thereto by set screws 61.

The sleeve 58 is circumscribed by a thimble-like member 62, the end wall of which is formed with a threaded opening receiving the threaded end of the sleeve 58 which is headed over to prevent the member from backing off the same. A compression spring 63 seating on the end wall of the member 62 acts against an inturned flange 64 carried by the sleeve 51. The spring urges the carrier 53 to the right as viewed in Fig. 6, and will tend to resist any movement of the carrier axially of the sleeve 51, the carrier, however, being free to move a limited distance against the action of the spring.

The sleeve 51 carries a collar formed with a plurality of flat surfaces, the opposite pairs of which are parallel. The collar is normally held within the opening at the rear of the carrier which is enlarged adjacent the end thereof to form an elongated noncircular cavity, the longer sides of which are parallel.

It will now be seen that the raised flat surfaces of the sleeve 51 and the noncircular cavity of the carrier form a clutch such as that shown in Figs.

1 to 3, and which acts to hold the carrier against rotation relative to the sleeve as long as a pair of flats of the mandrel are engaged by the parallel walls of the opening. The carrier, as the tool follows its own lead on the workpiece, is moved forward during the cutting operation after movement of the turret has been arrested to move the flats relative to the opening to cause a disengagement of the clutch and free the carrier for rotational movement with the workpiece.

The workpiece in this form of the invention as in the previously described form is disengaged from the die by reversing the direction of rotation of the spindle and holding the carrier against rotation until the workpiece is backed out of the die.

The braking means for holding the carrier against rotation also in this form of the invention is gradually made effective so that all danger of damage to the die which might result, should rotation of the carrier be stopped too quickly, is eliminated.

The brake here comprises the edge face of the thimble member 62 and the one face of the inturned flange 64 of the sleeve 51. The faces are brought into engagement by reason, as in the earlier described form of the present invention, of the longitudinal relative movement of the carrier and sleeve 58 as the turret begins its return movement from working position after the thread cutting operation.

Upon disengagement of the die with the workpiece, the carrier will be quickly returned by the spring 61 to its normal position relative to the turret as shown in Fig. 6, and as rotation of the carrier will not be completely arrested it will in most instances revolve sufficiently as it is returned to cause a pair of flats to engage the opposite walls of the opening. If the carrier comes to rest with a pair of the flats not properly engaging the walls of the opening, the machine operator need merely twist the carrier slightly until the flats properly seat within the opening.

Variations and modifications may be made within the scope of this invention and portions of the improvements may be used without others.

I claim:

1. A device of the type described comprising a carrier for holding a threading tool; means for securing said carrier to a turret of a screw machine or the like for axial and rotary movement relative thereto; means for rigidly holding said carrier against rotary movement while permitting axial movement thereof, said means being rendered inoperative to hold said carrier against rotary movement after the same has been axially moved a predetermined distance relative to said turret; and means to yieldingly restrain rotary movement of said carrier operative in both directions after the same has been axially moved relative to said turret a distance greater than said predetermined distance.

2. A device of the type described comprising a carrier for holding a threading tool; means adapted to be mounted to a turret of a screw machine or the like; means for coupling said carrier to said mounting means, said coupling means normally rigidly holding said carrier against rotary movement relative to said mounting means while permitting axial movement thereof, said means being inoperative to hold said carrier against said relative rotary movement after the same has been axially moved a predetermined distance relative to said mounting means; and brake means normally inoperative and rendered operative after the carrier has been axially moved relative to said mounting means a distance greater than said predetermined one for gradually and yieldingly restraining said carrier against relative rotary movement in both directions whereby said tool may be disengaged from the workpiece after the thread cutting operation.

3. A device of the type described comprising a carrier for holding a threading tool; means adapted to be mounted to a turret of a screw machine or the like; means for coupling said carrier to said mounting means, said coupling means rigidly holding said carrier against rotary movement relative to said mounting means while permitting axial movement thereof, said means being inoperative to hold said carrier against rotary movement after the same has been axially moved a predetermined distance relative to said mounting means; and brake means for frictionally holding said carrier against rotary movement after the same has been axially moved relative to said mounting means a distance greater than said predetermined one whereby the tool may be disengaged from the workpiece after the thread cutting operation, said frictional holding of said carrier yielding upon excess torque being applied.

4. A device of the type described, comprising a carrier for holding a thread cutting tool; mounting means for said carrier to be fixed to a turret of a screw machine or the like; means for coupling the carrier to said mounting means for limited axial movement relative thereto; and means for rigidly holding said carrier against rotational movement with respect to said mounting means, said last-named means being rendered inoperative to hold said carrier against rotational movement as the carrier is axially moved a predetermined portion of the axial movement permitted by said coupling means, said coupling means having cooperating frictional surfaces engaging to yieldingly restrain rotational movement of said carrier in both directions after the same has been axially moved relative to said mounting means the distance permitted by said coupling means.

5. In a device of the type described, a carrier for holding a thread cutting tool; mounting means for said carrier to be fixed within a turret of a screw machine or the like; means rigidly holding said carrier during the cutting operation against rotary movement relative to said mounting means while permitting axial movement with respect thereto; resilient means tending to hold said carrier in a normal position relative to said mounting means, said first-named holding means being rendered inoperative to hold said carrier against rotary movement after the same has been moved a predetermined distance axially of said mounting means; and friction means operative to yieldingly restrain rotary movement of said carrier in both directions after the same has been axially moved a distance greater than said predetermined distance whereby said tool may be disengaged from the workpiece, the resilient means axially moving said carrier relative to said mounting means to return the carrier to its normal position.

6. A device of the type described, comprising a carrier for holding a thread cutting tool; mounting means for said carrier to be fixed to a turret of a screw machine or the like; means for coupling said carrier to said mounting means, said means including interlocking rigid means for positively holding said carrier against rotation relative to said mounting means while permitting axial movement of the carrier with respect thereto so that the tool is free to follow its own lead on the workpiece, said rigid means disengaging upon relative movement of the carrier axially of said mounting means a predetermined distance to free said carrier for rotation relative to said mounting means; and means operative to yieldingly restrain rotary movement of said carrier in both directions after the same has been axially moved relative to said mounting means a distance greater than said predetermined distance.

7. A device of the type described, comprising a carrier for holding a thread cutting tool; mounting means for said carrier to be fixed to a turret of a screw machine or the like; means for coupling said carrier to said mounting means, said means including a rigid surface carried by said mounting means and a rigid receptor for said surface formed on said carrier, the surface engaging with said receptor when received therein for rigidly holding said carrier against rotation relative to said mounting means while permitting axial movement of the carrier with respect thereto so that the tool is free to follow its own lead on the workpiece; means for normally holding said surface within said receptor but permitting axial movement of said carrier as the tool follows its own lead on the workpiece, said surface disengaging from the receptor upon relative movement of the carrier axially of said mounting means a predetermined distance; and means operative to yieldingly restrain rotary movement of said carrier in each direction after the same has been axially moved relative to said mounting means a distance greater than said predetermined distance.

8. In a device of the type described, a carrier for holding a threading tool; mounting means for said carrier to be fixed within a turret of a screw machine or the like; a member projecting rearwardly of said carrier; a spring sleeving said member, said spring seating on said mounting means and acting against said projecting member of said carrier for resiliently holding said carrier in a normal position relative to said mounting means; means partially carried by said mounting means and partially carried by said carrier for rigidly holding said carrier against rotary movement relative to said mounting means while permitting axial movement with respect thereto against the action of said spring, said means being inoperative to hold said carrier against rotary movement after the same has been axially moved a predetermined distance relative to said mounting means; and means operative to yieldingly restrain rotary movement of said carrier after said carrier has been axially moved a distance greater than said predetermined distance, said means yielding upon excess torque being applied thereto.

9. In a device of the type described, a carrier for holding a thread cutting tool; a shank adapted to be fixed to a turret of a screw machine or the like, said shank including an external cylindrical surface; a sleeve fixed to said carrier and having an interior cylindrical surface which fits closely but slidably over the surface of said shank, the axis of each of said surfaces being coincident with the axis of said carrier; a rigid abutment formed on the surface of said shank, the sleeve being formed with a slot for receiving said abutment; a spring acting to normally hold said abutment within said slot, whereby said sleeve is held against rotational movement relative to said shank but movable axially thereof, movement of said carrier as the tool follows its own lead on the workpiece during the thread cutting operation causing said abutment to move out of said slot thereby permitting free rotational movement of said carrier relative to said shank; and means for holding said carrier against rotational movement in either direction after the carrier has been moved a predetermined distance greater than the distance necessary to cause disengagement of the abutment and the slot.

10. In a device of the type described, a carrier for holding a threading tool; a sleeve projecting rearwardly of said carrier; means for mounting said carrier to the turret of a screw machine or the like, said means including a forwardly projecting mandrel received within said sleeve, the outer surface of said mandrel forming a contact surface upon which the sleeve is mounted for rotational and axial movement; means carried by said mandrel and cooperative when engaged with means formed on said sleeve for positively holding said sleeve against rotary movement while permitting movement axially of said mandrel, movement of said sleeve a predetermined distance axially of said mandrel as the tool moves relative to the workpiece during the thread cutting operation disengaging the means on the mandrel with the means of the sleeve whereby said carrier is freed for rotation relative to said mandrel; and means carried by said carrier and engageable with said mandrel for frictionally holding said carrier against rotation after said sleeve has been axially moved relative to said mandrel a distance greater than that distance necessary to cause disengagement of the means of the mandrel with the means of the sleeve.

11. In a device of the type described, a carrier for holding a threading tool; a shank adapted to be mounted within a turret of a screw machine or the like; a sleeve projecting rearwardly of said carrier and sleeving the projecting end of said shank; a stem coaxially carried by said sleeve received within the bore of said shank; a spring sleeving said stem and normally tending to urge the same within the bore of said shank; rigid means carried by said shank and cooperative when engaged with means formed on said sleeve for holding said sleeve against rotary movement relative to said shank while permitting axial movement relative thereto, said spring normally urging the said means into cooperative engagement and resisting movement of the sleeve axially of the shank, movement of said sleeve a predetermined distance axially of said shank as the tool moves relative to the workpiece during the thread cutting operation disengaging said means and freeing said carrier for rotation relative to said shank; and means carried by said stem and movable therewith into engagement with said shank for frictionally holding said carrier against rotation after the sleeve has been moved a predetermined distance greater than that necessary to cause disengagement of the means of the shank with the means of the sleeve.

12. In a device of the type described, a carrier for holding a thread cutting tool; a sleeve projecting rearwardly of said carrier and having an internal contact surface; means for mounting said carrier to the turret of a screw machine or the like, said means including a forwardly projecting cylindrical contact surface adapted to be received within the sleeve and engaged by said first-named contact surface; a plurality of raised parallel flat surfaces carried by the said cylindrical contact surface, the end of said sleeve being formed with a noncircular opening for receiving at least some of said raised surfaces for clutching said sleeve to hold the same against rotation relative to said cylindrical contact surface while permitting axial movement thereof, movement of said sleeve axially of said contact surface as the tool follows its own lead on the workpiece during the thread cutting operation displacing said flat surfaces relative to said opening and freeing said carrier for rotation relative to said cylindrical contact surface; and means for holding said carrier against rotation in either direction after the carrier has been moved a predetermined distance greater than the distance necessary to cause disengagement between the raised surfaces of the cylindrical contact surface and the opening in the end of said sleeve.

13. In a device of the type described, a carrier for holding a threading tool; a shank adapted to be fixed to a turret of a screw machine or the like; means for coupling said carrier to said shank, said means including means for holding said carrier against rotational movement relative to said shank while permitting axial movement with respect thereto; resilient means for holding said carrier in a normal position relative to said shank and resisting axial movement of said carrier with respect to said shank, relative movement between the workpiece and said tool as the tool follows its own lead on the workpiece during the thread cutting operation causing movement of said carrier axially of said shank against the action of said resilient means, the coupling means being inoperative to hold said carrier against rotational movement relative to said shank after the carrier has been moved axially thereof a predetermined distance; and means separate from said first-named holding means for yieldingly holding said carrier against rotational movement in both directions after said carrier has been axially moved a distance greater than said predetermined distance, the resilient means returning said carrier to its normal position after the cutting operation and the tool has been disengaged from said workpiece.

GEORGE H. COTE.